United States Patent Office 3,473,391
Patented Oct. 21, 1969

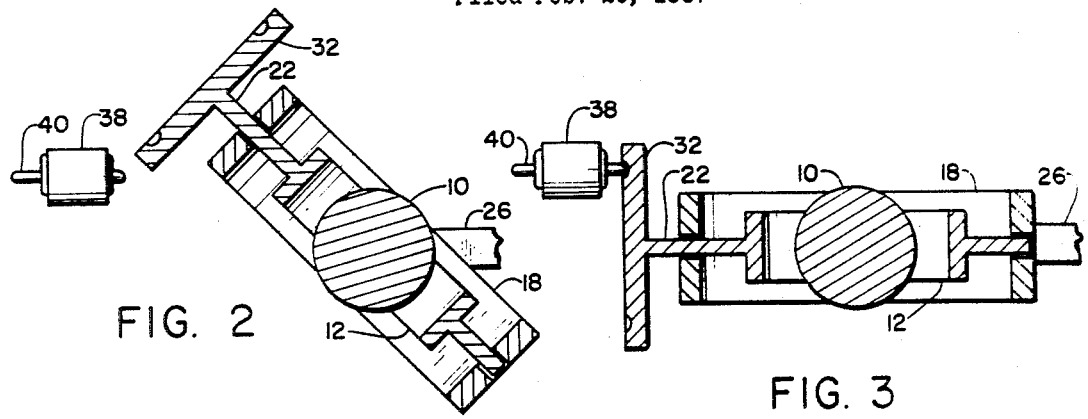
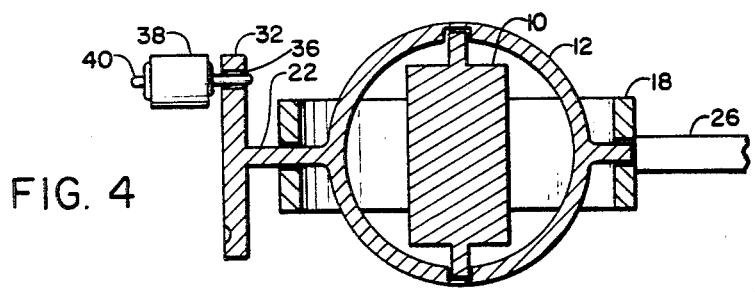
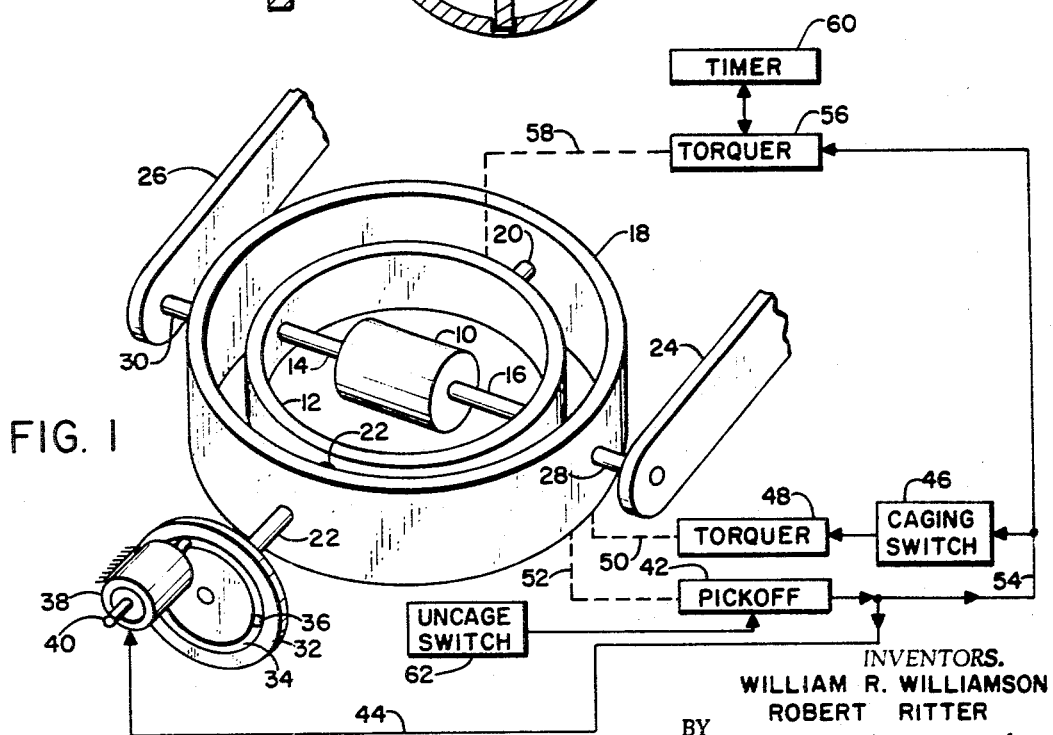

3,473,391
CAGING DEVICE FOR SIMULTANEOUSLY LOCKING TWO GIMBALS
William R. Williamson, New Brighton, and Robert Ritter, Fridley, Minn., assignors to Honeywell Inc., Minneapolis, Minn., a corporation of Delaware
Filed Feb. 20, 1967, Ser. No. 617,285
Int. Cl. G01c 19/24
U.S. Cl. 74—5.1                                5 Claims

ABSTRACT OF THE DISCLOSURE

A gyroscope caging mechanism in which a disc having an annular groove thereon is fastened directly to the pivot of the inner gimbal. A locking pin engages the groove when the outer gimbal is in the proper position regardless of the position of the inner gimbal and further engages a detent in the groove when the inner gimbal is in the correct position.

BACKGROUND OF THE INVENTION

This invention relates to gyroscopes and more particularly to a novel mechanism for fixing the gimbals of a gyroscope in a predetermined starting position. To achieve optimum performance of a gyroscope it is desirable to orientate the gyroscope rotor in its most sensitive position. This is done by rotating the mounting gimbals to the desired positions and mechanically locking them in those positions until such time as the gyroscope begins its operation. Prior art locking devices have included pins and clamps and other various mechanisms which grasp the gimbals and hold them rigidly in position until the gyroscope is released for operation. The disadvantage of such locking devices is that they are complicated, heavy, require continual and difficult adjustment, and tend to impart small unwanted torques to the gimbals as they release the gimbals from the fixed position.

SUMMARY OF THE INVENTION

Briefly, the present invention comprises an improved gimbal caging and locking mechanism in which a single solenoid driven pin operates to lock both gimbals simultaneously and release them on command with little or no unwanted torques. One of the pivots by which the inner gimbal is supported on the outer gimbal is extended directly through the outer gimbal and a disc with an annular groove thereon is mounted directly to this extended pivot. Conventional torque motors, well known to those skilled in the art, are used to drive the outer gimbal into the preferred position. When the outer gimbal reaches this position a solenoid operates to drive a pin into the groove on the disc and thereby lock the outer gimbal in position. Although the disc rotates with the inner gimbal the annular groove operates to accept the pin regardless of the position of the inner gimbal. Once the outer gimbal is locked in position a second torquer serves to drive the inner gimbal in a rotary fashion until the locking pin encounters a further depression or hole in the groove thus preventing rotation of the disc and the attached inner gimbal. This locks the second or inner gimbal in position. A timing device turns off the second torquer.

An object of the present invention is to provide an improved caging mechanism. A further object of our invention is to provide a single locking mechanism which simultaneously grasps both gimbals of a gyroscope. Other objects and adavantages will become apparent to those skilled in the art upon consideration of the following description and drawings.

BRIEF DESCRIPTION OF THE DRAWINGS

FIG. 1 is a schematic prespective drawing of a preferred embodiment of our invention;
FIGURES 2, 3 and 4 are section views of the apparatus of FIGURE 1 showing three successive stages in the caging operation. Identical components are numbered identically in all the figures.

DESCRIPTION OF THE PREFERRED EMBODIMENT

In FIGURE 1 a typical gyroscope is shown in which a rotor 10 is supported on a gimbal 12 by means of a pair of pivots 14 and 16. Gimbal 12 is in turn further supported on a gimbal 18 by means of a pair of pivots 20 and 22. Gimbal 18 is supported by a pair of supports 24 and 26 (which are only partially shown in FIGURE 1) by means of a pair of pivots 28 and 30. Pivot 22 is rigidly attached to gimbal 12 and extends through gimbal 18. A disc 32 is securely fastened to the end of pivot 22. An annular groove 34 is formed in the surface of disc 32 and is concentric about pivot 22. A small indentation or in the alternative a hole 36, is formed in groove 34. A solenoid 38 is fixedly mounted with respect to the supports 24 and 26 and operates to urge a locking pin 40 into groove 34 and hole 36 upon receiving an energizing signal from a pickoff 42 by means of a conductor 44.

In the operation of the preferred embodiment shown in FIGURE 1 it is desirable to orientate the rotor 10 in a vertical position and lock it in that position until the gyro is ready to operate. The manner in which this is achieved is additionally illustrated by FIGURES 2, 3 and 4. When a caging switch 46 is activated a torquer 48 operates to rotate gimbal 18. In FIGURE 1 the torquer output is shown by a dashed line 50. If rotor 10 is spinning the gimbal 18 will not move until gimbal 12 rotates into the same plane as gimbal 18. This is the position of the components shown in FIGURE 2. As soon as gimbal 12 and gimbal 18 are aligned torquer 48 will rotate gimbal 18 into a horizontal position as shown in FIGURE 3, When gimbal 18 reaches the horizontal position, pickoff 42 operates to sense this position by means of a connection shown as dashed line 52. Pickoff 42 accordingly signals solenoid 38 to engage the locking pin 40 with groove 34. If rotor 10 was not initially spinning, gimbal 12 may be in any random position when gimbal 18 reaches the horizontal position shown in FIGURE 3, however, since groove 34 is concentric about pivot 22, pin 40 falls into the groove regardless of the position of gimbal 12.

In addition to signaling solenoid 38, pickoff 42 also signals caging switch 46 (by means of a conductor 54) to turn off torquer 48. In addition pickoff 42 signals a torquer 56 to begin rotation of gimbal 12 by means of a connection shown as dashed line 58. When gimbal 12 reaches the predetermined vertical position such as shown in FIGURE 4, pin 40 will be aligned with hole 36 and since solenoid 38 is still energized pin 40 will drop into hole 36 preventing further rotation of gimbal 12. After a short period of time a timer 60 operates to turn off torquer 56.

It will be noted from FIGURE 4 that rotor 10 is now in the vertical position desired. Furthermore, gimbals 12 and 18 are properly positioned so that the gyroscope can function most effectively when it is released from this caged position. When it is desired to release the gyro for operation an uncaging switch 62 is activated so as to turn off the signal from pickoff 42 and allow locking pin 40 to spring back out of engagement with disc 32. Because of the design of the locking arrangement this action imparts little or no unwanted torques to the gimbal and releases both gimbals simultaneously in a single action.

It is evident that various modifications may be made to the apparatus disclosed herein without departing from the spirit and scope of the invention. Consequently, we do not intend the present invention to be limited to the particular embodiments shown except as defined by the appended claims.

We claim:
1. In a gyroscope:
   support means;
   a first gimbal rotatably mounted on said support means for rotation about a first axis;
   a second gimbal rotatably mounted on said first gimbal for rotation about a second axis substantially perpendicular to said first axis;
   a rotor member rotatably mounted on said second gimbal for rotation about a spin axis substantially perpendicular to said second axis;
   a locking pin; and
   a caging member mounted on said second gimbal having a first depression operable to engage said locking pin only when said first gimbal is in a first predetermined position and a second depression operable to engage said locking pin only when both said first and said second gimbals are in first and second predetermined positions respectively.

2. The apparatus of claim 1 in which said first depression comprises an annular groove and said second depression comprises a deeper portion in said annular groove.

3. The apparatus of claim 2 including torquing means operable to rotate said first and second gimbals to said first and second predetermined positions and including gimbal pickoff means operable to continuously urge said locking pin into engagement with said caging member after said first gimbal reaches said first predetermined position.

4. In a gyroscope:
   support means;
   a first gimbal rotatably mounted on said support means for rotation about a first axis;
   a second gimbal rotatably mounted on said first gimbal for rotation about a second axis perpendicular to said first axis;
   a rotor member rotatably mounted on said second gimbal for rotation about a spin axis perpendicular to said second axis;
   a caging member having a substantially circular annular groove therein, said groove having a detent;
   means mounting said caging member to said second gimbal in a position such that the center of the circular groove lies on said second axis;
   means mounting said caging member to said second gimbals operable to rotate said first and second gimbals to first and second predetermined positions; and
   pin means operable to engage the groove when said first gimbal reaches said first predetermined position and operable to further engage the detent when said second gimbal reaches said second predetermined position.

5. The apparatus of claim 4 including gimbal pickoff means operable to continuously urge said locking pin means into engagement with said caging member after said first gimbal reaches said first predetermined position.

References Cited

UNITED STATES PATENTS

| | | | |
|---|---|---|---|
| 2,441,157 | 5/1948 | Kissel | 74—5.1 |
| 2,741,922 | 4/1956 | Nolan et al. | 74—5.1 XR |
| 2,795,142 | 6/1957 | Smith | 74—5.1 |
| 2,799,169 | 7/1957 | Welti | 74—5.1 |
| 2,874,577 | 2/1959 | Shirley | 74—5.1 |
| 2,884,787 | 5/1959 | Simons | 74—5.1 |
| 2,960,874 | 11/1960 | Glenny et al. | 74—5.1 |

FRED C. MATTERN, Jr., Primary Examiner

MANUEL ANTONAKAS, Assistant Examiner

UNITED STATES PATENT OFFICE

CERTIFICATE OF CORRECTION

Patent No. 3,473,391                                    October 21, 1969

William R. Williamson et al.

It is certified that error appears in the above identified patent and that said Letters Patent are hereby corrected as shown below:

Column 4, line 14, "means mounting said caging member to said second" should read -- torquing means connected to said first and second --.

Signed and sealed this 27th day of October 1970.

(SEAL)
Attest:

Edward M. Fletcher, Jr.                      WILLIAM E. SCHUYLER, JR
Attesting Officer                                    Commissioner of Patents